United States Patent [19]

Nathan

[11] 4,387,876
[45] Jun. 14, 1983

[54] CONSTANT FORCE GENERATOR MECHANISM AND ADJUSTABLE SEAT CONSTRUCTED THEREWITH

[75] Inventor: Roger H. Nathan, Beersheba, Israel

[73] Assignee: Advanced Products Beer-Sheva Ltd., Beer Sheva, Israel

[21] Appl. No.: 279,408

[22] Filed: Jul. 1, 1981

Related U.S. Application Data

[63] Continuation of Ser. No. 37,172, May 5, 1979, abandoned.

[51] Int. Cl.³ .............................................. F16M 13/00
[52] U.S. Cl. .................................. 248/571; 248/280.1; 248/281.1; 248/421; 297/345
[58] Field of Search ................ 267/131, 182; 248/571, 248/280.1, 281.1, 421; 297/345, DIG. 10

[56] References Cited

U.S. PATENT DOCUMENTS

| | | | |
|---|---|---|---|
| 2,535,305 | 12/1950 | Loepsinger | 248/571 |
| 2,906,524 | 9/1959 | Oakes et al. | 248/571 X |
| 2,969,972 | 1/1961 | Kolmen | 248/571 X |
| 2,989,276 | 6/1961 | Debbage | 248/571 |
| 3,179,364 | 4/1965 | Jackson et al. | 248/571 |
| 3,534,934 | 10/1970 | McCabe | 248/571 |
| 3,890,907 | 6/1975 | Peterson | 248/571 |
| 3,897,036 | 7/1975 | Nystrom | 248/421 |
| 4,206,898 | 6/1980 | Salter | 248/571 X |

FOREIGN PATENT DOCUMENTS

| | | | |
|---|---|---|---|
| 1038107 | 5/1953 | France | 248/571 |
| 1308798 | 10/1961 | France | 267/131 |
| 434903 | 10/1967 | Switzerland | 248/571 |
| 1276992 | 6/1972 | United Kingdom | 248/571 |

OTHER PUBLICATIONS

*Product Engineering;* vol. 32, No. 3; pp. 46 & 47; Jan. 16, 1961.
Static Mass Balancing with a Torsion Spring and Four-bar Linkage; *A.S.M.E. Publication,* by W. Harming; 6/1964.
Spring Mechanisms; by K. Hain; *Spring Design and Application;* 1961; pp. 268-275.

*Primary Examiner*—James T. McCall
*Attorney, Agent, or Firm*—Benjamin J. Barish

[57] ABSTRACT

A constant force generator mechanism is described, comprising a rigid first link adapted to be fixed to a support, a rigid second link mounted for pivotable movement to the first link by a first hinge joint, and a spring link hingedly mounted to the first link by a second hinge joint and hingedly mounted to the second link by a third hinge joint. The spring link is one having a linear spring rate and a zero free length whereby, upon pivotting the second link with respect to the first link, the spring link generates a force whose component parallel to the first link at any given point on the second link is constant through the entire range of pivotable movement of the second link.

Also described is a chair having a seat continuously adjustable by the above constant force generator mechanism.

9 Claims, 9 Drawing Figures

CONSTANT FORCE GENERATOR MECHANISM AND ADJUSTABLE SEAT CONSTRUCTED THEREWITH

RELATED APPLICATION

This application is a continuation of application Ser. No. 37,172, filed May 5, 1979, now abandoned.

BACKGROUND OF THE INVENTION

The present invention relates to a constant force generator mechanism, and to a continuously adjustable seat constructed with such mechanism.

Various types of hydraulic, pneumatic and electrical drive units have been designed for generating a constant force, but such devices are usually of expensive construction and therefore of very limited application. Several mechanical devices have also been developed for this purpose, such as counter-balancing weights and tensator springs, but as a rule, these mechanical devices, at best, are capable of generating a force which is nearly constant, and then only over a limited range of motion of the mechanism. Probably the closest approximation to a constant force generator mechanism so far achieved to date is that described in the publication Harmening, N. "Static Mass balancing with a Torsion Spring and Four-Bar Linkage," ASME Paper No. 74-DET-29, which mechanism includes a four bar linkage and torsion spring balancing mass statically, i.e. to generate a constant vertical force. However, even this mechanism is an approximation.

An object of the present invention is to provide a constant force generator mechanism based on an exact analytical solution to generate a constant force. Another object of the invention is to provide such a mechanism of simple construction so that it may be used as a basic mechanism or modular unit for inclusion in a large number of different applications. A still further object of the present invention is to provide, as one application of the basic mechanism, a chair having a seat continuously adjustable in height with respect to its frame by means of the novel constant force generator mechanism.

SUMMARY OF THE INVENTION

According to a broad aspect of the present invention, there is provided a constant force generator mechanism, comprising: a rigid first link adapted to be fixed to a support; a rigid second link mounted for pivotable movement to said first link by a first hinge joint; and a spring link hingedly mounted to the first link by a second hinge joint, and hingedly mounted 40 the second link by a third hinge joint. The spring link has a linear spring rate and zero free length whereby, upon pivotting the second link with respect to the first link, the spring link generates a force whose component parallel to the first link at any given point on the second link is constant throughout the entire range of pivotable movement of the second link.

The basic mechanism thus comprises but three links connected by three hinge joints, two of the links being rigid, and the third being a spring link having a linear spring rate and zero free length. This means that in the normal unloaded condition of the spring, its effective length between the two rigid links to which it is coupled by hings joints is zero, and that the spring is loaded at a linear rate by the movement of one rigid link with respect to the other.

A mathematical analysis is set forth below showing that such a mechanism generates a constant force. Accordingly, for optimum results, the spring link should have exactly a linear spring rate and exactly zero free length. In practice, however, there are many applications wherein it would not be essential that the force generated be exactly constant for all movements, and therefore some deviation from exact linearity and zero-free length would be permissible and is contemplated in the present invention.

Providing a spring link with zero free length is not difficult from the mechanical aspect. Thus, the spring may be an extension spring or a compression spring including a force-transmitting member attached at one end to the spring, and at the opposite end to the second link such as to deform the spring upon pivotting the second link away from the first link. The force-transmitting member may be a tensile member or a compressive member. Described below, for purposes of example, are two embodiments, one including an extension spring and a tensile member, and the other including a compression spring and also a tensile member.

The mathematical analysis below also shows how the parameters of the mechanism may be varied to adapt the mechanism to a wide variety of applications, thereby justifying its description as a basic mechanism. Thus, the magnitude of the generated force can be varied by adjusting the second hinge joint on the first link, by adjusting the third hinge joint on the second link, or by adjusting the first hinge joint with respect to both the first and second links. The foregoing adjustments may be made manually to preset the magnitude of the generated force. Alternatively, the adjustments may be made automatically by feedback from the external force to produce an equilibrium between the externally-applied force and the generated force.

As also described below, the mechanism may include a rigid third link parallel to said first link, and a rigid fourth link parallel to said second link, said third and fourth link being hingedly joined to said first and second links to form a four-bar parallelogram linkage therewith.

As one example of the many diverse applications such a mechanism may be put to, there is described below, according to a further aspect of the invention, a chair having a seat continuously adjustable in height with respect to its frame by means of the novel constant force generator mechanism.

BRIEF DESCRIPTION OF THE DRAWINGS

Further features and advantages of the invention will be apparent from the description below.

The invention will be better understood by reference to the accompanying drawings, wherein.

DESCRIPTION OF PREFERRED EMBODIMENTS

Figure 1:
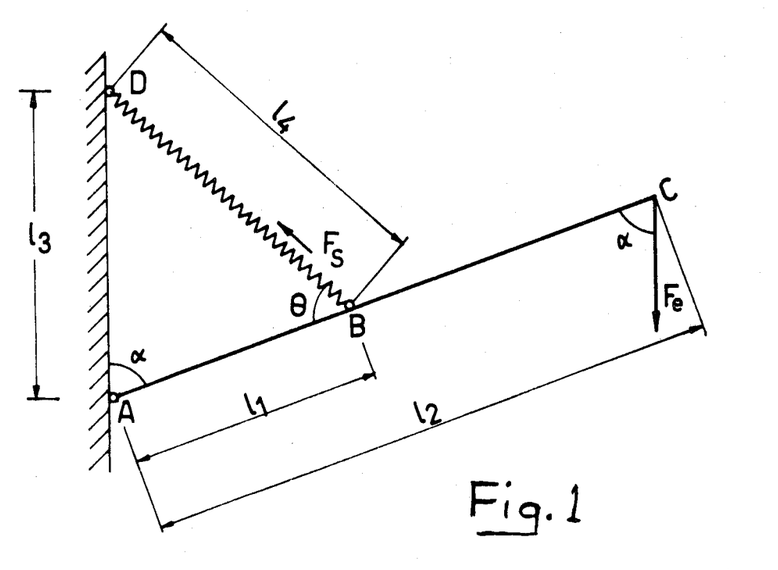
FIG. 1 is a diagram illustrating the basic constant force generator mechanism constructed in accordance with the invention.

With reference first to FIG. 1, illustrating the basic constant force generator mechanism, there is now set forth below an analysis of this mechanism to show its generation of a constant force.

The mechanism comprises three links: a light rigid lever ABC, freely hinged at A as shown in FIG. 1, a fixed link AD, and a linear spring link BD, freely hinged at B and D. The spring force is denoted by $F_s$ and an external force $F_e$, parallel to AD, is applied to the lever at C, such as to hold the system in equilibrium. We can now write equations to represent the geometry and the equilibrium of the system.

Taking moments about A for lever AC we have, $$F_e l_2 \sin \alpha - F_s l_1 \sin \theta = 0 \qquad (1)$$

and for the spring force $F_s$ we have, $$F_s = ke \qquad (2)$$

where k is the spring rate, and e is the spring extension. Substituting for $F_s$ in equation (1) and rearranging gives $$F_e = \frac{kel_1 \sin \theta}{l_2 \sin \alpha} \qquad (3)$$

Now from the geometry of triangle ABD, we have $$l_4 = \frac{l_3 \sin \alpha}{\sin \theta} \qquad (4)$$

Let us now make the spring of zero free length. (In practice this is not difficult to arrange). We now have $$e = l_4 \qquad (5)$$

and hence $$e = \frac{l_3 \sin \alpha}{\sin \theta} \qquad (6)$$

Substituting this expression for e into equation (3) now gives $$F_e = \frac{k l_1 l_3}{l_2} \qquad (7)$$

This final equation expresses the external equilibrant force $F_e$ as a product of four constant mechanism parameters: the spring rate k, and three linear dimensions of the mechanism. The external equilibrant force $F_e$ is itself thus constant, and is independent of the mechanism position parameter $\alpha$. The force generated by the mechanism at C is equal and opposite to the equilibrant force, and will also be constant for a full rotation of lever AC about A.

The constant force component generated at C is parallel to AD (FIG. 1). Its direction may thus be changed only by altering the angle of the fixed link AD. The magnitude of the generated force can be adjusted by altering any of the four parameters given in equation (7); either the spring rate k, or the mechanism linear dimensions $l_1$, $l_2$, or $l_3$. The change in one or more of these linear parameters may be carried out manually, or by a feedback system from the external force $F_e$. We shall now examine the latter possibility.

With respect to the latter possibility, it will be seen that in one of the linear dimensions $l_1$, $l_2$, or $l_3$ may be carried out by moving either points A or B along the line AC, or by moving points A or D along AD. In practice it is necessary to move only one of these points to fully control the magnitude of the generated force.

Figure 2:
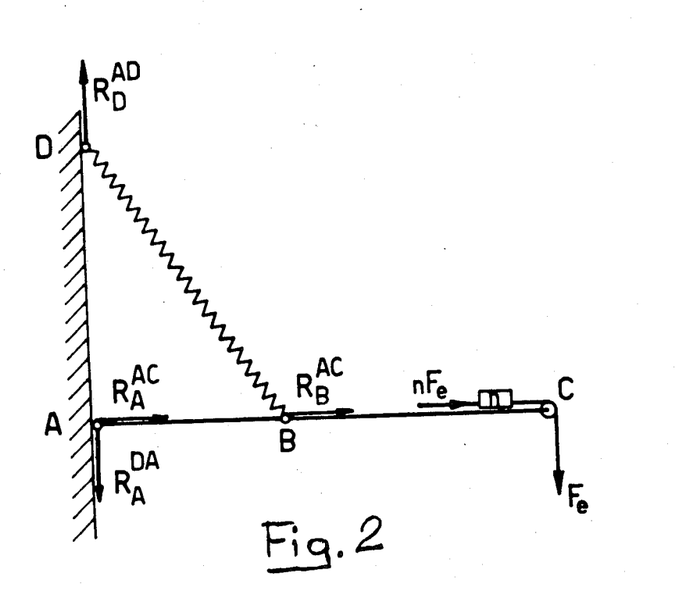
FIGS. 2, 3 and 4 are diagrams illustrating different manners of adjusting the basic mechanism of FIG. 1.

FIG. 2 illustrates an arrangement wherein a free sliding joint is introduced at the point which is to be controlled, and a reaction is supplied to the joint in the direction of sliding which will cause it to move to a position on its link which will produce equilibrium of the mechanism (i.e. equilibrium of moments about the hinge A of the lever AC). The force ($R_e$) to be fed back to the sliding joint will be taken from the external load, and will be of the form, $$R_e = nF_e \qquad (8)$$

where n is a constant. A pulley system and string may be used to amplify and transmit the force and, for a simple pulley system, n will have an integer value. For equilibrium of the feedback force with a general slider reaction $R_x^{xy}$ (applied at x in the direction xy), we have, $$R_x^{xy} = R_e \text{ hence } R_x^{xy} = nF_e \qquad (9)$$

The following are the values of the slider reactions, derived in terms of geometric parameters of the mechanism and of the external load $F_e$, for equilibrium of the system about joint B. Their arrangement is shown in FIG. 2.

$$R_B^{AC} = F_e \left[ \frac{l_2 \sin \alpha}{l_1 \tan \theta} \right] \qquad (10)$$

$$R_A^{AC} = F_e \left[ \frac{l_2 \sin \alpha}{l_1 \tan \theta} + \cos \alpha \right] \qquad (11)$$

$$R_A^{DA} = F_e \left[ \frac{l_2 \sin^2 \alpha}{l_1} - \frac{l_2 \sin \alpha \cos \alpha}{l_1 \tan \theta} - 1 \right] \qquad (12)$$

$$R_D^{AD} = F_e \left[ \frac{l_2 \sin^2 \alpha}{l_1} - \frac{l_2 \sin \alpha \cos \alpha}{l_1 \tan \theta} \right] \qquad (13)$$

In order that this set of equations should be of the form given in equation (9), the terms in square brackets in each case should be constant and preferably of integer value, at least during adjustment of the mechanism, and should be equal in magnitude to n as defined above.

Let us now specify the conditions for which the bracketed terms fulfil these requirements.

(a) Each term is a function of $\alpha$. In each case we must therefore hold a constant while the mechanism is being adjusted.

(b) Each bracketed term is a function of $\theta$. As we cannot hold $\theta$ constant, we must eliminate terms containing $\theta$.

(c) Equations (10) and (11) are functions of $l_1$, where $l_1$ is the contolled variable. We must eliminate $l_1$ from these two equations.

All these conditions may be satisfied by putting $\alpha = \pi/2$. This gives $\tan\theta = l_3/l_1$. Substituting these values into equations (10) to (13) gives, $$R_B^{AC} = F_e \left[ \frac{l_2}{l_3} \right] \quad (14)$$

$$R_A^{AC} = F_e \left[ \frac{l_2}{l_3} \right] \quad (15)$$

$$R_A^{DA} = F_e \left[ \frac{l_2}{l_1} - 1 \right] \quad (16)$$

and $$R_D^{AD} = F_e \left[ \frac{l_2}{l_1} \right] \quad (17)$$

The multiplier of $F_e$ (in square brackets) is now a constant term in each case—in equations (14) and (15) $l_3$ is constant, and in equations (16) and (17) $l_1$ is constant. The constant term is equal in value in each case to the gain n in the force $F_e$ fed back to balance the reaction at A, B, or D.

Figure 3:
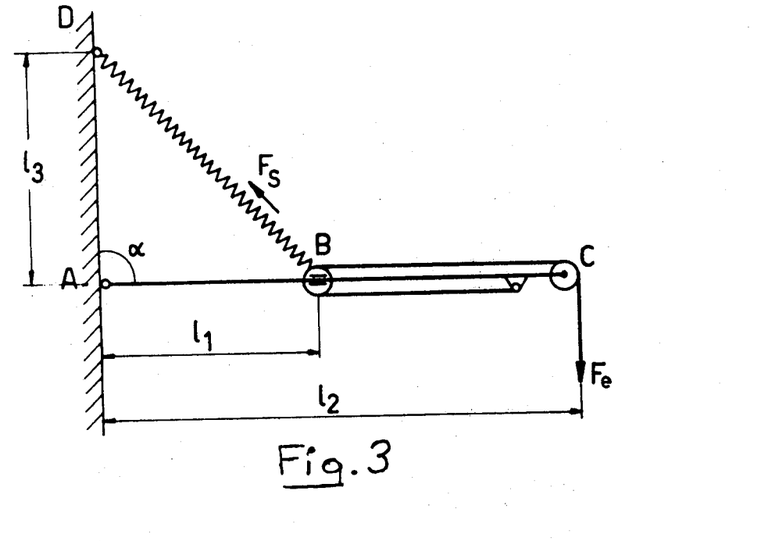
Figure 4:
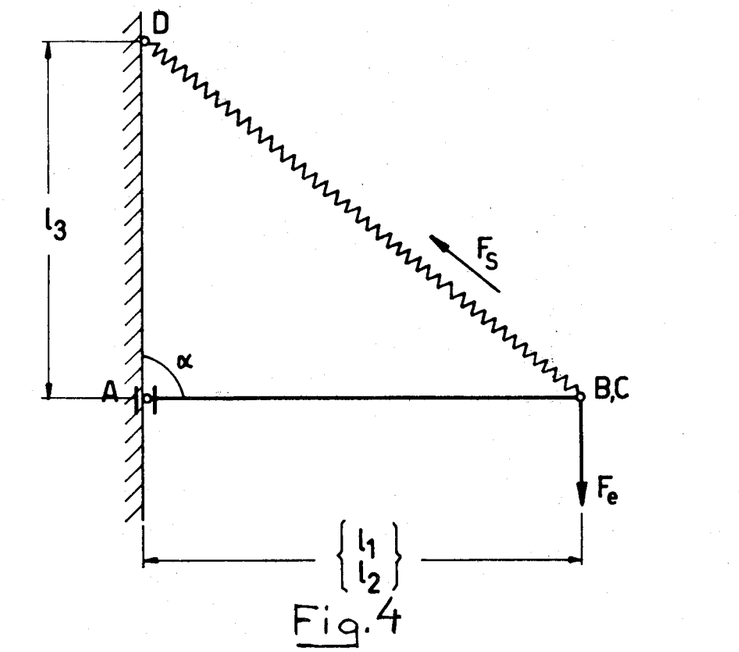

FIGS. 3 and 4 illustrate two arrangements of the self adjusting mechanism, based on equations (14) and (16), controlling mechanism points B along AC, and A along AD respectively.

In FIG. 3, the adjustment of the linear parameter $l_1$ is effected by introducing a free sliding joint at B along AC. From equations (9) and (14).

$$n = l_2/l_3 \quad (18)$$

Thus as a precondition for automatic adjustment, the ratio of the mechanism parameters $l_2:l_3$ must equal the feedback force gain n. FIG. 3 shows the mechanism for $n = l_2/l_3 = 2$. The reaction at B due to force feedback from the load $F_e$ is given by $$R_B^{AC} = 2F_e.$$

In the adjustment mode, joint A is locked at $\alpha = \pi/2$ by some mechanical arrangement. For any positive value of the load $F_e$, point B will slide to its correct position on AC to balance moments about the axis A. In practice, having reached the equilibrium position, the slider at B is locked, and joint A is released. The mechanism is now in static equilibrium for rotation of the lever AC through a full circle about A.

In FIG. 4, the adjustment of parameter $l_3$ is effected by control of point A.

Of the equation set (14) to (17), equation (16) is of a slightly different form in that it contains an additional negative term:

$$R_A^{DA} = F_e[l_2/l_1 - 1]$$

If we put $l_2 = l_1$ in this equation, we now have, $$R_A^{DA} = 0$$

This is to say, under the geometric conditions specified, no additional feedback from the load $F_e$ is required at all. FIG. 4 shows this arrangement in practice.

In the adjustment mode, the point A is free to slide along AD, and the hinge joint at A is locked at $\alpha = \pi/2$. When $F_e = 0$, A will lie at D. As $F_e$ is increased, A slides vertically downwards to its correct equilibrium position. The sliding joint at A is now locked, and the hinge joint unlocked, and once again the lever AC can be rotated through a full circle about A in static equilibrium with a constant external force $F_e$.

Figure 5:
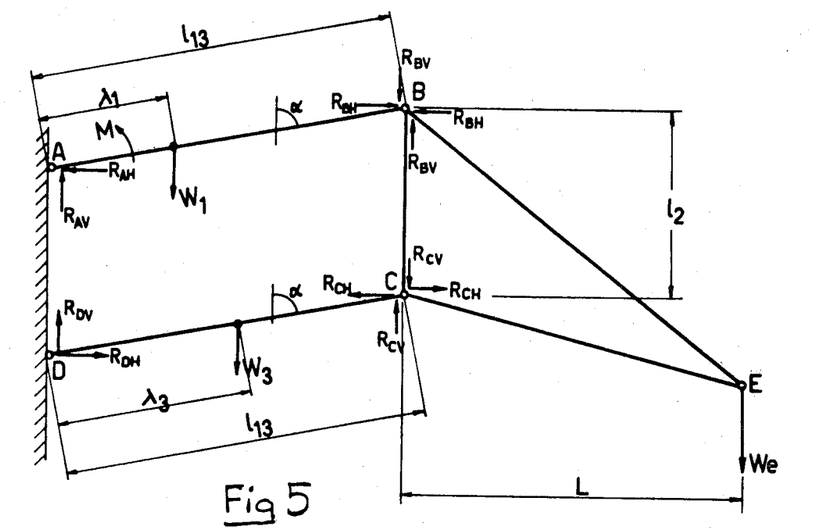
FIG. 5 is a diagram illustrating the constant force generator mechanism incorporated in a four-bar parallelogram linkage.

FIG. 5 illustrates an arrangement wherein link AC in FIG. 1 is replaced by a four bar parallelogram linkage ABCD. The two links AD and BC are vertical, and to either or both of the links AB and DC may be attached the spring of the constant force generator. In the following analysis this spring is replaced for simplicity by a moment M about the axis A of the link AB. The link DC is here assumed to be without a spring.

Link BC is extended to E, and an external force is applied to the link such that the resultant of this force plus the weight of the link itself is given by a vertical force $W_e$ acting at E, a horizontal distance L from BC. The weights of the links AB and DC are given by $W_1$ and $W_3$ acting at distances $\lambda_1$ and $\lambda_3$ from A and D respectively.

Let us now examine the possibility of statically balancing this system using the constant force generator mechanism. Writing equilibrium equations for each of the three moving links AB, BCE, and DC, we have for link DC, taking moments about D, $$W_3\lambda_3 \sin\alpha - R_{CV}l_{13}\sin\alpha - R_{CH}l_{13}\cos\alpha = 0 \quad (19)$$

For link BCE, resolving forces horizontally, $$R_{CH} - R_{BH} = 0 \quad (20)$$

resolving forces vertically, $$R_{BV} - R_{CV} - W_e = 0 \quad (21)$$

and taking moments about B, $$W_e L - R_{CH} l_2 = 0 \quad (22)$$

For link AB, taking moments about A, $$W_1\lambda_1 \sin\alpha + R_{BV}l_{13}\sin\alpha + R_{BH}l_{13}\cos\alpha - M = 0 \quad (23)$$

The four unknown joint reactions at B and C are now eliminated as follows:

Substituting for $R_{CH}$ from equation (22) into equation (19) gives, $$W_3\lambda_3 l_2 \sin\alpha - R_{CV}l_{13}l_2 \sin\alpha - W_e L l_{13} \cos\alpha = 0 \quad (24)$$

and substituting for $R_{BH}$ from equations (20) and (22) into equation (23), and for $R_{BV}$ from equation (21) gives, $$W_1\lambda_1 l_2 \sin\alpha + (W_e + R_{CV})l_{13}l_2 \sin\alpha + W_e L l_{13} \cos\alpha - Ml_2 = 0 \quad (25)$$

Eliminating $R_{CV}$ by adding equations (24) and (25) gives $$(W_1\lambda_1 + W_3\lambda_3 + W_e l_{13}) \sin \alpha = M \qquad (26)$$

Equation (26) is the equilibrium equation, giving the moment M required to balance this force system. The form of the moment generated by the constant force mechanism is given above as the product of a constant vertical force, a constant length (given in FIG. 1 by $F_e$ and $l_2$ respectively), and sin α, where α is the angle of the link with respect to the vertical. The force system given by equation (26) is of similar form, and may thus be balanced by the constant force generator mechanism. Furthermore it may be seen that the required moment is independent of the distance L. The external force $W_e$ can be effectively represented by a shear force $W_e$ acting along BC plus a force couple acting at B and C, parallel to AB and DC, and of magnitude proportional to the distance L. This important result means that the external force $W_e$ may be moved laterally without affecting the required equilibrant movement M.

Figure 6:
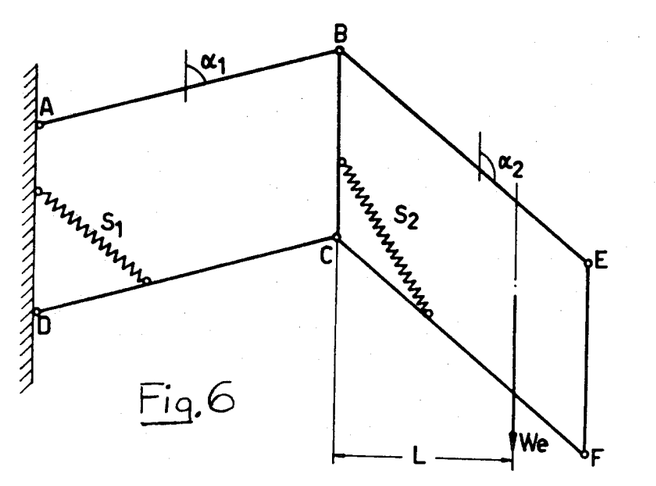
FIG. 6 is a diagram illustrating the constant force generator mechanism incorporated in a chain of two four-bar parallelogram linkages.

The significance of this result becomes apparent if we replace link BCE with an additional four bar linkage BEFC, held in equilibrium against gravity by its own constant force generator mechanism, as shown in FIG. 6. The weights of the members of the mechanism, plus any vertical external forces are represented by a resultant $W_e$ acting at a distance L from BC. The force system acting on the mechanism ABCD here is similar to the previous case, shown in FIG. 5. Here however, the distance L is not constant, but is a function of $\alpha_2$. As the required equilibrant moment in ABCD is independent of L, equilibrium of the mechanism ABCD is also independent of $\alpha_2$.

It will thus be seen that an open or closed chain of four bar mechanism elements can be built up and supported against gravity by a constant force generator in each element, and can support in equilibrium constant external vertical forces acting at any given points on the rigid links along the chain. Let us now analyze an m element open-ended chain, each element supporting an external vertical force. A general expression can be derived for the equilibrant moment required in the ith element, and from this the constant force generator parameters may be expressed in terms of parameters of the chain plus any vertical external forces.

The total weight of the members of the $j^{th}$ element is given by $W_j$, and the external vertical force acting on it by $P_j$. Also, for the $i^{th}$ element, the weights of the upper and lower links are given by $W_{1i}$ and $W_{3i}$, with centre of gravity a distance $\lambda_{1i}$ and $\lambda_{3i}$ along their respective links, measured from the proximal end. The external vertical force on the $i^{th}$ element $P_i$, acts at a distance $\lambda_{pi}$ along the element, measured from the proximal end; and the upper and lower links of the element are of length $l_i$ and are at an angle $\alpha_i$ to the vertical.

We can now extend equation (26) and write an expression for the total equilibrant moment required in the $i^{th}$ link, $$M_i = \left( \sum_{j=i+1}^{j=m} [W_j + P_j]l_i + W_{1i}\lambda_{1i} + W_{2i}\lambda_{2i} + P_i\lambda_{pi} \right) \sin\alpha_i \qquad (27)$$

But referring to FIG. 1, equation (7) gives $$F_e = \frac{kl_1 l_3}{l_2}$$

Replacing the generated force $F_e$ by a moment M, generated about joint A, where $$M = F_e l_2 \sin \alpha,$$

we now have
$$M = kl_1 l_3 \sin \alpha.$$

Equating this value of the generated moment with that of the required moment in equation (27) gives $$kl_1 l_3 = \sum_{j=i+1}^{j=m} [W_j + P_j]l_i + W_{1i}\lambda_{1i} + W_{2i}\lambda_{2i} + P_i\lambda_{pi} \qquad (28)$$

This final general equation for the system expresses the constant force generator parameters, the spring rate k, and the distances of the spring attachment points from the hinge, $l_1$ and $l_3$, in terms of the parameters of the chain of four bar linkage elements, and the additional vertical forces applied to each element.

It will thus be seen that the above-described invention provides a new and very simple mechanism for generating a constant force. Although it may be used as a modular element in balancing general forcing functions, its main application will be probably in static balancing of masses. Either fixed masses may be balanced by a fixed parameter mechanism, or a simple mechanical feedback system may be added to the mechanism, enabling automatic preadjustment of one of the controlling mechanism parameters to give subsequent equilibrium of the mechanism.

The suitability of the constant force generator for inclusion into a parallelogram four bar mechanism is demonstrated above, and it is shown that for a chain of mechanism links, each link can be replaced by an element comprising a parallelogram four bar mechanism with a constant fource generator. With this arrangement, the mechanism links plus any additional masses or external vertical forces applied to any of the rigid mechanism links can be statically balanced. The only component which may introduce some error into the static balance is the spring link, due to redistribution of its mass as a function of the mechanism motion. This error will be only a very small percentage of the forces involved, and may be eliminated altogether by mounting the spring vertically, and transmitting the spring force e.g., by a pulley and string arrangement.

Figure 7:
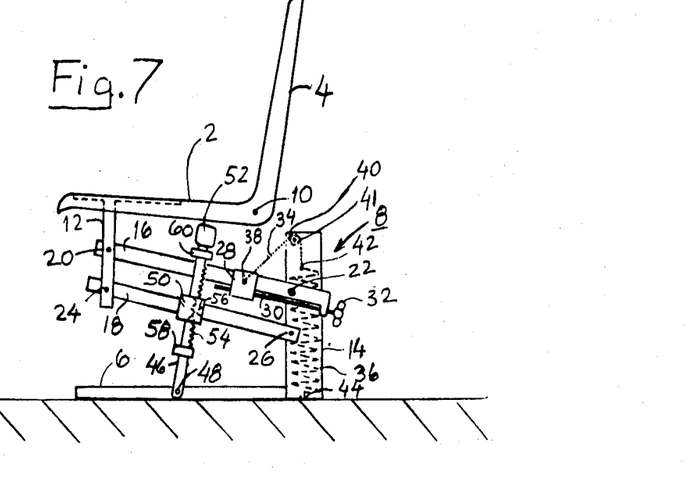
FIG. 7 illustrates a constant force generator mechanism in accordance with the invention incorporated in a chair to permit the continuous adjustment the height of the seat, the spring link of this mechanism including an extension spring.
Figures 8, 9:
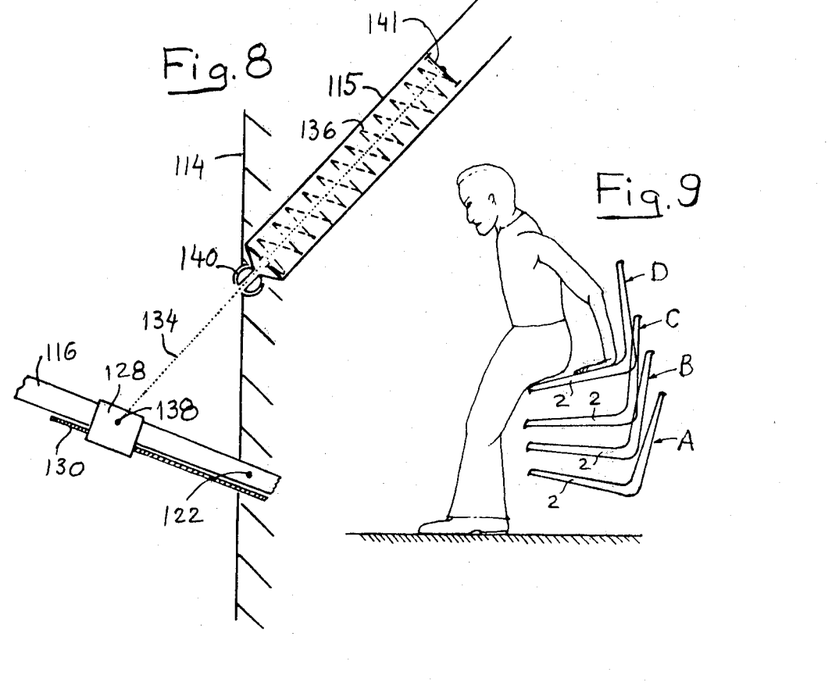
FIG. 8 illustrates another arrangement that may be used wherein the spring link is a compression spring.
FIG. 9 diagrammatically illustrates the various positions assumed by the seat of the chair of FIG. 8 during its continuous adjustment in height.

FIG. 7 illustrates a constant force generator mechanism constructed in accordance with the invention embodied in a chair in which the seat is continuously adjustable in height while a person is sitting in it. As the seat moves down it also tilts backwardly, and on rising it tilts forwardly, as shown in FIG. 9. A spring included in the constant force generator mechanism between the seat and the frame of the chair generates a constant vertical force to the seat, which force may be adjusted to support all or part of the body weight of the person in the chair over the complete range of motion.

The arrangement illustrated in FIG. 7 enables continuous adjustment of the seat height as shown in FIG. 9, from a minimum position of about 30 cms from the ground (arm chair height, position (A) suitable for relaxation; to a mid-height position B for sitting upright, for example at a table; to position (C), suitable for example for working at a drawing board; to the highest position (D) (approximately 70 cms from the ground) enabling the occupant to enter or leave the chair with great ease as he is now almost in a standing position. The chair is thus suitable for use where it is required to operate continuously at different heights from the seated position, for example in the home, office or factory. Also it may be used by physically disabled persons who have difficulty in sitting down or rising from a standard chair and in changing chairs for different activities; for this purpose, the seated mechanism may be fitted into a wheelchair.

The chair, as illustrated in FIG. 7, comprises a seat 2 having a backrest 4 supported on a chair frame 6 by means of a constant force generator mechanism constructed in accordance with the invention and generally designated 8. Preferably, backrest 4 is integrally formed with or rigidly attached to chair seat 2, but if desired it may be hinged at 10 to the chair seat to enable the backrest 4 to fold down on the seat for storage and transportation.

The constant force generator mechanism 8 is coupled to a bar 12 fixed to the chair seat 2 and extending vertically below it. Bar 12 forms, with the constant force generator mechanism 8, a four-bar linkage in which: bar 2 constitutes the coupler link to the chair seat; a part of a cylinder 14 fixed vertically to the chair frame 6 constitutes the coupler link to the chair frame; and the top parallel bars 16, 18 constitute the two crank links. Link 16 is hinged at one end to bar 12 by hinge 20, and at the opposite end to the cylinder 14 by hinge 22; and link 18 is hinged at one end to bar 12 by hinge 24, and at the opposite end to cylinder 14 by hinge 26. The four-bar linkage is thus a parallelogram but modified to provide the tilting movements of the chair illustrated in FIG. 9.

Link 16 carries a slide 28 manually adjustable by means of a screw 30 rotatable by a knob 32 to move same linearly along link 16. A tensile member 34, such as a cord or cable, constitutes a flexible force-transmitting connection between slide 28 and a tension spring 36 disposed within housing 14. One end of the tensile member 34 is fixed, at 38, to slide 28; the opposite end is passed over a guiding pin 40 and a direction-changing roller or pulley 41 rotatably mounted on a horizontal axis within housing 14 and is attached, at 42, to the upper end of spring 36. The lower end of the spring is fixed to the housing 14 which, as mentioned above, is fixed to the chair frame 6.

A locking bar 46 is hinged at 48 to the chair frame 6 and passes through a sleeve 50 fixed to the lower link 18 of the four-bar linkage. The upper end of locking bar 46 is provided with a handle 52 for gripping by the user. Locking bar 46 is formed with teeth 54 engageable with a stop or tooth 56 formed within sleeve 50 for locking the chair seat 2 in an adjusted vertical position. The locking bar is further provided with end stops 58 and 60 engageable with sleeve 50 of link 18 to limit the two extreme adjustment positions of the chair seat 2.

It will be seen that the basic constant force generator mechanism is defined by the spring housing 14 which corresponds to rigid link AD in FIG. 1; link 16 which corresponds to rigid link AC in FIG. 1 and hinged thereto at hinge joint 22 corresponding to hinge joint A in FIG. 1; and the spring link which is constituted by linear extension spring 36 connected to link 16 by means of the flexible tensile member 34 fixed at 42 to the upper end of the spring, and at 38 to slide 28 carried by link 16.

The guiding pin 40 over which the tensile member 34 passes to the pulley 41 in effecting the connection between spring 36 and link 16, is disposed vertically above the hinge joint 22 between link 16 and housing 14. The arrangement is such that in the unloaded condition of spring 36, the hinge joint 38 would be substantially at the guiding pin 40 so that the spring link 36 would have zero free length as well as a linear spring extension rate. This is the theoretical optional for exact constant force generation, but as mentioned above, some deviation is permissible in many practical applications.

Since the mechanism 8 in FIG. 7 coupling the chair seat 2 to the chair frame 6 corresponds to the basic constant force generator mechanism illustrated in FIG. 1, for all pivotal movements of link 16 with respect to the spring housing 14, spring 36 will generate a force whose component parallel to housing 14 (i.e. the vertical component) is constant throughout the entire range of pivotable movement of link 16 with respect to housing 14. Accordingly, the force generated by the mechanism will be substantially constant for all the vertical positions A—D (FIG. 9) of the chair seat 2.

It will thus be seen any constant load applied to link 16 at any point on its center line may be balanced by spring 36 for a full rotation of the link about hinge joint 22. A person sitting on seat 2 acts as such a load, and his weight is transmitted via bar 12 to hinge joint 20 on the center line of link 16.

The magnitude of the force generated by the mechanism may be varied by rotating knob 32 which moves slide 28 along link 16. The greater the distance hinge joint 38 carried by the slide is located from hinge joint 22 between link 16 and housing 14, the greater will be the force generated by the spring. Accordingly, the user may rotate knob 32 to adjust the chair for his weight, so that when his full weight is applied to the chair seat, the seat assumes position A in FIG. 9, and by transferring more of his weight to his legs, the chair seat automatically rises to the positions B—D.

The user may manipulate locking bar 46 to fix the vertical position of the chair seat 2. For this purpose, the user grips handle 52 and swings the locking bar counterclockwise about hinge 48 in order to release teeth 54 of the locking bar from the stop 56 carried by sleeve 50 in link 18. This permits the vertical adjustment of the seat, after which the user may swing the locking bar clockwise to lock the seat in the adjusted position. As indicated above, end stops 58 and 60 carried by the locking bar 46 limit the extreme positions of the seat.

It will be appreciated that, as the chair construction illustrated in FIG. 7 meets the basic requirements of the constant force generator mechanism illustrated in FIG. 1, it is also subject to the several variations described above, particularly with respect to FIG. 1. For example, instead of adjusting the magnitude of the generator force by moving slide 28 along link 16, to move point 33 along the axis of the link, a similar adjustment of the generator force can be effected in other ways, namely: by moving hinge joint 20 along the axis of link 10; by moving hinge joint 22 vertically upwards or downwards along the spring housing 14; or by guiding pin 40 before pulley 41 vertically upwardly or downwardly with respect to the spring housing 14. Any of these adjustments is permissible and does not alter the constant force characteristics of the mechanism.

In addition, sleeve 50 cooperable with locking bar 46 for locking the chair in its adjusted position, could be carried by link 16, rather than by link 18, or by any other element which moves with these links.

Further, other arrangements may be used for providing the zero free length characteristic of the spring link. FIG. 8 illustrates one such other variation in which, instead of using an extension spring for the spring link, there is used a compression spring.

As shown in FIG. 8, link 116, corresponding to link 16 in FIG. 7, is hinged at hinge joint 122 to a support 114, constituting the second rigid link of the mechanism. Slide 128 carried by link 116 and movable by screw 130 (corresponding to elements 28 and 30 in FIG. 7) is coupled via a tensile member 134 to a compression spring 136 contained within a cylindrical housing 115. One end of tensile member 134 is hinged at joint 140 to frame 114; hinge joint 138 and 140 correspond to hinge joints 38 and 40 in FIG. 7. The opposite end of tensile member 134 carries a pressure disc 141 which, upon pivoting link 116 away from frame 114, compresses spring 136.

The arrangement in FIG. 8 is such that compression spring 136 is unloaded when hinge joint 138 at one end of stem 134 coincides with hinge joint 140 of housing 115, so that spring 136 has zero free length. Spring 136 also has a linear spring rate, so that the mechanism illustrated in FIG. 8 meets the requirements of the basic constant force generator mechanism as described above with respect to FIG. 1.

It will be further appreciated that the force-transmitting member 134 in FIG. 8 could be a compressive member, rather than a tensile member, by making it in the form of a rigid stem acting against the lower end of spring 136, the upper end being limited against a fixed stop.

As indicated above, the four-bar linkage included in the adjustable seat arrangement of FIG. 7 is not a true parallelogram linkage, but rather is a modified one to provide the tilting illustrated in FIG. 9 at the beginning and end movements. Such four-bar parallelogram linkages may also beused in suppl many other types of weights, and by using a chain of two (or more) such four-bar parallelogram linkages as illustrated in FIG. 6, the weight may be supported for movement in three dimensions by the application of a relatively light external force.

Also, other types of springs could be used, for example torsion bars.

The invention may be applied in a wide variety of applications besides the continuously adjustable chair illustrated in FIGS. 7–9 as merely one application of the invention. Examples of such other applications include counter-balancing dental equipment, camera equipment, X-ray equipment, and varous types of heavy working tools.

Many other variations, modifications and applications of the invention will be apparent.

What is claimed is:

1. A constant force generator mechanism, comprising: a rigid first link adapted to be fixed to a support; a rigid second link mounted for pivotable movement to said first link by a first hinge joint; and a spring link hingedly mounted to said first link by a second hinge joint, and hingedly mounted to said second link by a third hinge joint; said spring link having a linear spring rate and zero free length whereby, upon pivoting the second link with respect to the first link, the spring link generates a force whose component parallel to the first link at any given point on the second link is constant through the entire range of pivotable movement of the second link, said second hinge joint being adjustable on said first link to vary the magnitude of the generated force.

2. The mechanism according to claim 1, wherein said spring link comprises a spring fixed at one end to said first link and attached at its opposite end to one end of a force-transmitting member, the opposite end of the force-transmitting member being attached to said second link such as to deform said spring upon pivotting the second link away from the first link.

3. The mechanism according to claim 1, wherein said spring link comprises a spring disposed within a housing hingedly mounted to said first link and constituting said second hinge joint, said housing including a force-transmitting member hingedly mounted at one end to said second link and constituting said third hinge joint, the opposite end of the force-transmitting member being coupled to said spring to deform same upon pivotting the second link away from the first link.

4. The mechanism according to claim 1, wherein the adjustable hinge joint is automatically adjustable by feedback from the external force to produce an equilibrium between the external force and the generated force.

5. The mechanism according to claim 1, further including a rigid third link parallel to said first link, and a rigid fourth link parallel to said second link, said third and fourth links being hingedly joined to said first and second links to form a four-bar parallelogram linkage therewith.

6. The mechanism according to claim 5, further including an additional four-bar parallelogram linkage, wherein said third link is common to both of said parallelogram linkages, said additional four-bar parallelogram linkage including an additional spring link having a linear spring rate and a zero free length hingedly mounted to said common third link and another rigid link of the additional parallelogram linkage.

7. A chair having a seat continously adjustable in height with respect to a frame, and including a constant force generator mechanism according to claim 1, said first link being fixed to the chair frame, and the chair seat being coupled to said second link such that the weight on the seat is parallel to said first link.

8. The chair according to claim 7, wherein said constant force generator mechanism further includes a rigid third link parallel to said first link, and a rigid fourth link parallel to said second link, said third and fourth links being hingedly joined to said first and second links to form a four-parallelogram linkage therewith.

9. The chair according to claim 8, further including manual adjusting means for manually adjusting said third hinge joint of the spring link along said second link to vary the magnitude of the force generated by said spring link.

* * * * *